US012162731B2

(12) United States Patent
Orfey

(10) Patent No.: US 12,162,731 B2
(45) Date of Patent: Dec. 10, 2024

(54) MOBILE CRANE, MOBILE CRANE SYSTEM AND METHOD FOR ADDING AND REMOVING GUYING EQUIPMENT TO AND FROM A MOBILE CRANE

(71) Applicant: Tadano Demag GmbH, Zweibrücken (DE)

(72) Inventor: Peter Orfey, Homburg (DE)

(73) Assignee: Tadano Demag GmbH, Zweibrücken (DE)

( * ) Notice: Subject to any disclaimer, the term of this patent is extended or adjusted under 35 U.S.C. 154(b) by 513 days.

(21) Appl. No.: 17/629,088

(22) PCT Filed: Jul. 21, 2020

(86) PCT No.: PCT/EP2020/070574
§ 371 (c)(1),
(2) Date: Jan. 21, 2022

(87) PCT Pub. No.: WO2021/013843
PCT Pub. Date: Jan. 28, 2021

(65) Prior Publication Data

US 2022/0315395 A1 Oct. 6, 2022

(30) Foreign Application Priority Data

Jul. 25, 2019 (DE) ..................... 10 2019 120 134.9

(51) Int. Cl.
*B66C 23/00* (2006.01)
*B66C 23/36* (2006.01)
(Continued)

(52) U.S. Cl.
CPC .............. *B66C 23/82* (2013.01); *B66C 23/36* (2013.01); *B66C 23/701* (2013.01); *B66C 2700/0357* (2013.01)

(58) Field of Classification Search
CPC ....... B66C 23/701; B66C 23/36; B66C 23/82; B66C 23/826; B66C 23/70; B66C 23/365
See application file for complete search history.

(56) References Cited

U.S. PATENT DOCUMENTS 10,640,339 B2 5/2020 Martin et al.
10,640,340 B2 5/2020 Kuhn et al.
(Continued)

FOREIGN PATENT DOCUMENTS

DE 10228345 A1 * 10/2003 ............. B66C 23/42
DE 202005015044 U1 12/2005
(Continued)

OTHER PUBLICATIONS

Preliminary Report on Patentability of the International Searching Authority in English from corresponding Patent Cooperation Treaty (PCT) Application No. PCT/EP2020/070574, completed Jan. 25, 2022.

*Primary Examiner* — Emmanuel M Marcelo
(74) *Attorney, Agent, or Firm* — Gardner, Linn, Burkhart & Ondersma LLP

(57) ABSTRACT

A mobile crane comprising a telescopic boom which has a main casing with linearly moveable inner casings. Guying equipment can be added to the telescopic boom, where at least one securing region arranged on the main casing is provided for the fixing of the guying equipment. In order for the adding and removal of the guying equipment to and from from mobile crane to be carried out more easily and safely, at least one coupling region is arranged on one of the inner casings for adding and/or removing the guying equipment and which can be connected to the same. In this way, the guying equipment can be received directly from a transport unit by the at least partially extended telescopic boom, the
(Continued)

guying equipment can be moved onto the main casing by retracting the telescopic boom and coupled to the same.

20 Claims, 11 Drawing Sheets

(51) Int. Cl.
*B66C 23/70* (2006.01)
*B66C 23/82* (2006.01)

(56) References Cited

U.S. PATENT DOCUMENTS

| | | | | |
|---|---|---|---|---|
| 10,647,553 | B2 | 5/2020 | Martin et al. | |
| 10,781,083 | B2 | 9/2020 | Kuhn et al. | |
| 11,130,659 | B2 | 9/2021 | Muller | |
| 2010/0252522 | A1* | 10/2010 | Conrad | B66C 23/82 212/177 |
| 2010/0282700 | A1* | 11/2010 | Richter | B66C 23/365 212/177 |
| 2020/0002139 | A1* | 1/2020 | Backes | B66C 23/828 |
| 2021/0221658 | A1* | 7/2021 | Königstein | B66C 23/365 |
| 2021/0292136 | A1* | 9/2021 | Meissner | B66C 23/826 |

FOREIGN PATENT DOCUMENTS

| | | | | |
|---|---|---|---|---|
| DE | 102017101113 | B3 * | 7/2018 | B66C 23/706 |
| DE | 102018119316 | A1 | 2/2020 | |
| DE | 102020101101 | B3 * | 5/2021 | B66C 23/346 |
| EP | 1342692 | B1 | 6/2008 | |
| EP | 2248754 | B1 | 6/2014 | |

* cited by examiner

MOBILE CRANE, MOBILE CRANE SYSTEM AND METHOD FOR ADDING AND REMOVING GUYING EQUIPMENT TO AND FROM A MOBILE CRANE

CROSS REFERENCE TO RELATED APPLICATION

The present application claims the priority benefits of International Patent Application No. PCT/EP2020/070574, filed Jul. 21, 2020, and claims benefit of German patent application DE 10 2019 120 134.9, filed Jul. 25, 2019.

BACKGROUND AND FIELD OF THE INVENTION

The invention relates to a vehicle crane which has a telescoping jib with a basic box and linearly displaceable inner boxes, wherein the telescoping jib can be equipped with a bracing apparatus, at least one fastening region arranged on the basic box being provided in order to fix said bracing apparatus. The invention also relates to a vehicle crane system which comprises such a vehicle crane and a bracing apparatus and a transport unit designed to transport the bracing apparatus. Furthermore, the invention relates to a method for transferring a bracing apparatus from a transport unit of a vehicle crane system onto a telescoping jib of a vehicle crane and to a method for transferring a bracing apparatus from a telescoping jib of a vehicle crane onto a transport unit of a vehicle crane system.

Typically, the factors determining how vehicle cranes, in particular mobile cranes, can be used are set by the structural design thereof. Technical variables such as load-bearing capacity, working radius and lifting height are determined essentially by the design of the respective telescoping jib. By using a bracing apparatus which can be coupled to the telescoping jib, the variables of a vehicle crane can at times be changed in order for instance to increase its load-bearing capacity and reduce the sagging of its telescoping jib. Such a bracing apparatus can be e.g. a lateral superlift, the arrangement of which can serve to advantageously reduce the lever arm of the telescoping jib. The increase in load-carrying capacity rendered possible thereby is mostly produced by combination with an additional counterweight and corresponding deflections over this bracing apparatus.

Owing to the weight of such vehicle cranes, which is usually very heavy, said cranes often arrive at their respective place of usage only in a partially disassembled manner in order to be able to respect the maximum values for the axle load and vehicle weight which are set for travelling on public roads. In this context, German utility model specification DE 20 2005 015 044 U1 discloses a vehicle crane as part of a vehicle crane system which comprises a telescoping jib which has a basic box with linearly displaceable inner boxes. The telescoping jib can be equipped with a bracing apparatus of the vehicle crane system, at least one fastening region arranged on the basic box being provided in order to fix said bracing apparatus. With a transport unit of the vehicle crane system, the bracing apparatus can be transported separately to and from the respective place of usage.

In the specific embodiment, the bracing apparatus is brought to the place of usage on the transport unit and lifted therefrom by the telescoping jib of the vehicle crane and is supported on the ground. For this purpose, the bracing apparatus has a support device which is folded out before the bracing apparatus is put down. The free space thus remaining between the ground and the bracing apparatus is then used in order to arrange the correspondingly luffed-down telescoping jib by moving the vehicle crane underneath the bracing apparatus and to then couple same to the basic box of the telescoping jib.

European patent specification EP 1 342 692 B1 likewise discloses a vehicle crane system, of which the vehicle crane itself has a storage region for the bracing apparatus. On site, the bracing apparatus received by the telescoping jib of the vehicle crane can be intermediately stored on its storage region in a first step. Then, the telescoping jib is luffed-down into an assembly position, in which the bracing apparatus can be coupled to the basic box of the telescoping jib.

European patent specification EP 2 248 754 B1 discloses a similar structure for the vehicle crane of a vehicle crane system. In contrast thereto, its storage region is smaller, and so the intermediate storage of the bracing apparatus received by the telescoping jib of the vehicle crane is effected by placing it down only at the end on said storage region, while the opposite end stands on the ground via a support device. In this case, the telescoping jib is then also luffed down to an assembly position, in which the bracing apparatus is coupled to its basic box.

The known designs always require intermediate storage of the received bracing apparatus on the ground or on a storage region, formed for this purpose, on the vehicle crane, in order to allow the rigging/de-rigging thereof. Particularly in the case of uneven or unstable ground, the at least end-side support of the bracing apparatus thereon can be made difficult. Forming an additional storage region on the vehicle crane likewise gives rise to disadvantages in that the installation space required for this purpose must be kept free and therefore cannot be used for other purposes, or can only be used with difficulty. Overall, there is still room for improvement in this respect in the previously disclosed embodiments in the prior art.

Furthermore, German laid-open document DE 10 2018 119 316 A1 discloses an attachment part-transport unit, with which a bracing apparatus—a so-called lateral superlift—can be transported separately from a vehicle crane and placed on a basic box of a telescoping jib of the vehicle crane or can be picked up from that location. The attachment part-transport unit consists substantially of a towing vehicle having a loading surface for transporting the bracing apparatus and a tilting apparatus for placing down or picking up the attachment part-transport unit. With the tilting apparatus, one end of the bracing apparatus can be tilted up from the loading surface in a first step. The mobile crane then travels with the basic box of its telescoping jib under this end which is then lowered on the basic box. Subsequently, the other end of the bracing apparatus is lifted by the tilting apparatus and placed down on the basic box in an arcuate movement. In this case, the other end of the bracing apparatus rolls on the top side of the basic box further in the direction of its foot. At the end, the bracing apparatus is fastened to the basic box and the tilting apparatus is then pivoted back to the attachment part-transport unit.

SUMMARY OF THE INVENTION

The present invention provides an improved vehicle crane and a vehicle crane system containing the vehicle crane in such a way that the rigging and de-rigging of the vehicle crane in relation to the bracing apparatus can be performed more easily and safely as a whole. Furthermore, two methods will be demonstrated which are used to simplify in particular the transferring of the bracing apparatus between the vehicle crane and its transport unit.

A vehicle crane in accordance with the invention comprises a coupling region which is arranged on one of the inner boxes of the telescoping jib and can be connected to the bracing apparatus for the purpose of rigging and/or de-rigging the bracing apparatus. In other words, not only does the basic box designed to receive the bracing apparatus have a fastening region designed to fix the bracing apparatus because now one of the inner boxes also has a coupling region provided for temporary connection to the bracing apparatus.

The resulting advantage can be seen as being the elimination of the previously still required intermediate storage of the bracing apparatus. This means that the bracing apparatus which is still placed down on the transport unit can now be received from its loading surface exclusively with the aid of the telescoping jib itself and can be displaced to the location where it is fixed to the basic box. Specifically, the telescoping jib can be arranged for this purpose below the bracing apparatus such that the latter can be connected to the coupling region of the previously extended inner box. By reason of the subsequent retraction of the inner box, a forced transfer of the bracing apparatus away from the transport unit to the vehicle crane can be performed. The portion of the bracing apparatus facing the vehicle crane can be displaced onto the basic box of the telescoping jib to such an extent that the bracing apparatus reaches its fastening position on the basic box without any intermediate storage. In this manner, the rigging and de-rigging of the vehicle crane in relation to the bracing apparatus can be performed more easily and safely as a whole.

According to a preferred further development of the basic idea of the invention, the required coupling region can be arranged at a free end portion of an inner box of the telescoping jib. In terms of the invention, the free end portion is understood to be that portion of the inner box which, even in the retracted state of the telescoping jib, protrudes from the basic box or a further inner box, in which the inner box having the coupling region is arranged in a displaceable manner. The inner box can have e.g. a collar which is located at its free end portion and on which the coupling region is arranged or formed.

According to a further aspect of the invention, the coupling region can be arranged on a first inner box, wherein said first inner box is supported directly in the basic box of the telescoping jib. In order to be able to receive the bracing apparatus e.g. from its transport unit, the first inner box together with the further inner boxes supported in it must be extended until the coupling region thereof can be coupled to a corresponding region of the bracing apparatus. By reason of the arrangement on the first inner box, the coupling region is in the immediate vicinity of the basic box when the telescoping jib is in the retracted state, whereby the bracing apparatus coupled to the first inner box can be displaced as far as possible onto the basic box.

The inventive vehicle crane now presented enables extremely simple rigging and de-rigging of the vehicle crane with a bracing apparatus, which can be performed in only a few steps. Any problematic ground surfaces are irrelevant here, since the bracing apparatus can be displaced directly from the transport unit onto the telescoping jib and back again without intermediate storage on said ground. Already existing vehicle cranes can be retrofitted with the coupling region which is to be arranged in accordance with the invention on an inner box, without the need to additionally create an additional storage region for intermediate storage of the bracing apparatus.

The invention is further directed to a vehicle crane system which comprises an inventive vehicle crane as previously described and a bracing apparatus and a transport unit designed to transport the bracing apparatus. The advantages which become apparent from this correspond to those already specified for the vehicle crane in accordance with the invention and so to avoid repetition reference is made at this juncture to the previous statements relating thereto.

According to a particular embodiment of the vehicle crane system in accordance with the invention, its bracing apparatus can have a first connection region corresponding to the coupling region of one of the inner boxes of the telescoping jib of the vehicle crane. Furthermore, the bracing apparatus can have a second connection region corresponding to the fastening region of the basic box of the telescoping jib of the vehicle crane. In this case, the first connection region serves to temporarily connect the bracing apparatus for rigging and de-rigging the vehicle crane to the inner box comprising the coupling region. In contrast thereto, the second connection region of the bracing apparatus is provided in order to connect it to the basic box before it is actually used in the state in which it is arranged on the basic box of the telescoping jib.

In a particularly advantageous manner, the first connection region and the second connection region of the bracing apparatus can be arranged next to one another for this purpose. This means that the part of the bracing apparatus which has the connection regions can have a correspondingly slender design in order to keep weight and dimensions as low as possible. Preferably, the first and second connection regions can therefore also be arranged directly next to one another.

In a further embodiment of the vehicle crane system in accordance with the invention, a support device is provided. This can be arranged on the bracing apparatus and/or the transport unit. The support device is designed to support the bracing apparatus above a loading surface of the transport unit. For this purpose, the bracing apparatus can be arranged e.g. only at one end region of the bracing apparatus or the transport unit. This is particularly advantageous if the opposite end region of the bracing apparatus is configured in such a way that it can itself be placed down on the loading surface of the transport unit. In each case, the support device serves to arrange the bracing apparatus whilst forming a free space above the loading surface. During the rigging and de-rigging of the vehicle crane, the free space provides sufficient space for the telescoping jib, which is to be displaced, quasi under the bracing apparatus in order to complete its movements necessary for receiving and placing down the bracing apparatus. Particularly preferably, the support device can be pivotably arranged on the bracing apparatus and/or the transport unit and so it can be displaced between a usage position and a non-usage position. Their usage position serves to support the bracing apparatus. When arranged on the transport unit, the non-usage position of the support device serves to keep it as space-saving and safe as possible, particularly during the movement of the transport unit. In contrast thereto, when the support device is arranged on the bracing apparatus, the non-usage position serves to ensure that the support device lies as compactly as possible against the telescoping jib.

The inventive vehicle crane system now presented offers as a whole the solution which has already been explained in connection with the vehicle crane in accordance with the invention and so, to avoid repetition, reference is made at this juncture to the corresponding statements relating thereto.

Furthermore, the invention is directed to a method in which a bracing apparatus is transferred from a transport unit of a vehicle crane system to a telescoping jib of a vehicle crane. The vehicle crane system and/or the vehicle crane can be the previously described vehicle crane system in accordance with the invention and/or the vehicle crane in accordance with the invention. In each case, the method comprises the following steps: providing the transport unit having the bracing apparatus, received thereon, in the region of the vehicle crane; arranging the transport unit and telescoping jib relative to one another such that a longitudinal direction of the bracing apparatus is oriented with respect to a longitudinal direction of the telescoping jib; before or after the arranging step, orienting the longitudinal direction of the telescoping jib towards a free space located between a loading surface of the transport unit and the bracing apparatus; extending at least one inner box of the telescoping jib into the free space; orienting, in particular luffing, the telescoping jib until a first connection region of the bracing apparatus is aligned with a coupling region of an inner box; coupling the first connection region of the bracing apparatus to the coupling region of the inner box; retracting the at least one inner box with simultaneous displacement of the bracing apparatus away from the transport apparatus towards the vehicle crane; terminating the retraction of the at least one inner box as soon as a second connection region of the bracing apparatus is aligned with a fastening region of a basic box of the telescoping jib; coupling the second connection region of the bracing apparatus to the fastening region of the basic box; releasing the coupling between the first connection region of the bracing apparatus and the coupling region of the inner box.

According to a particularly preferred development of the method in accordance with the invention, during or after the retraction of the telescoping jib, a support device designed to support the bracing apparatus on the loading surface of the transport unit can be pivoted from a usage position to a non-usage position. In an advantageous manner, the support device can be arranged on the transport unit for this purpose, wherein its non-usage position means that it can be placed down on the loading surface by pivoting.

Furthermore, the invention is directed to a method, in which a bracing apparatus is transferred from a telescoping jib, in particular from its basic box, of a vehicle crane to a transport unit of a vehicle crane system. The vehicle crane system and/or the vehicle crane can be the previously described vehicle crane system in accordance with the invention and/or the vehicle crane in accordance with the invention. In each case, the method comprises the following steps: providing the transport unit in the region of the vehicle crane; where required, retracting or extending the telescoping jib until a first connection region of the bracing apparatus is aligned with a coupling region of an inner box of the telescoping jib; coupling the first connection region of the bracing apparatus to the coupling region of the inner box; decoupling a second connection region of the bracing apparatus from a fastening region of the basic box; subsequently or previously arranging a transport apparatus and telescoping jib relative to one another such that a longitudinal direction of the telescoping jib is oriented with respect to the longitudinal direction of a loading surface of the transport unit; extending at least the inner box of the telescoping jib coupled to the bracing apparatus whilst simultaneously displacing the bracing apparatus away from the vehicle crane towards the loading surface of the transport unit; terminating the extension of telescoping jib as soon as the bracing apparatus is arranged on or above the loading surface of the transport unit; where required, orienting, in particular luffing, the telescoping jib such that the bracing apparatus is placed down on the loading surface of the transport unit; decoupling the first connection region of the bracing apparatus from the coupling region of the inner box; retracting the telescoping jib until it is at least removed from a free space located between the loading surface of the transport unit and the bracing apparatus; where required, previously or simultaneously orienting, in particular luffing, the telescoping jib in such a way that it has no contact with the bracing apparatus.

In an advantageous manner, during or after termination of the extension of the telescoping jib, a support device designed to support the bracing apparatus on the loading surface of the transport unit can be pivoted from a non-usage position to a usage position. In an advantageous manner, the support device can be arranged on the transport unit for this purpose, wherein its non-usage position means that it can be placed down on the loading surface by pivoting.

The advantages achieved by the respective method in accordance with the invention have already been disclosed or at least analogously discussed in conjunction with the vehicle crane in accordance with the invention and/or the vehicle crane system in accordance with the invention and so at this juncture reference is made to the previous statements in that regard to avoid repetition.

Of course, the methods in accordance with the invention which have been described in greater detail above using the example of a bracing apparatus for a telescoping jib of a vehicle crane can also be applied to other attachment parts. This depends upon the configuration and incorporation of the respective attachment part, also with the measure(s) related to a luffing cylinder being dispensed with and/or adapted analogously.

An exemplified embodiment of the invention will be explained in greater detail with reference to the following description.

DESCRIPTION OF THE PREFERRED EMBODIMENTS

Figure 1:
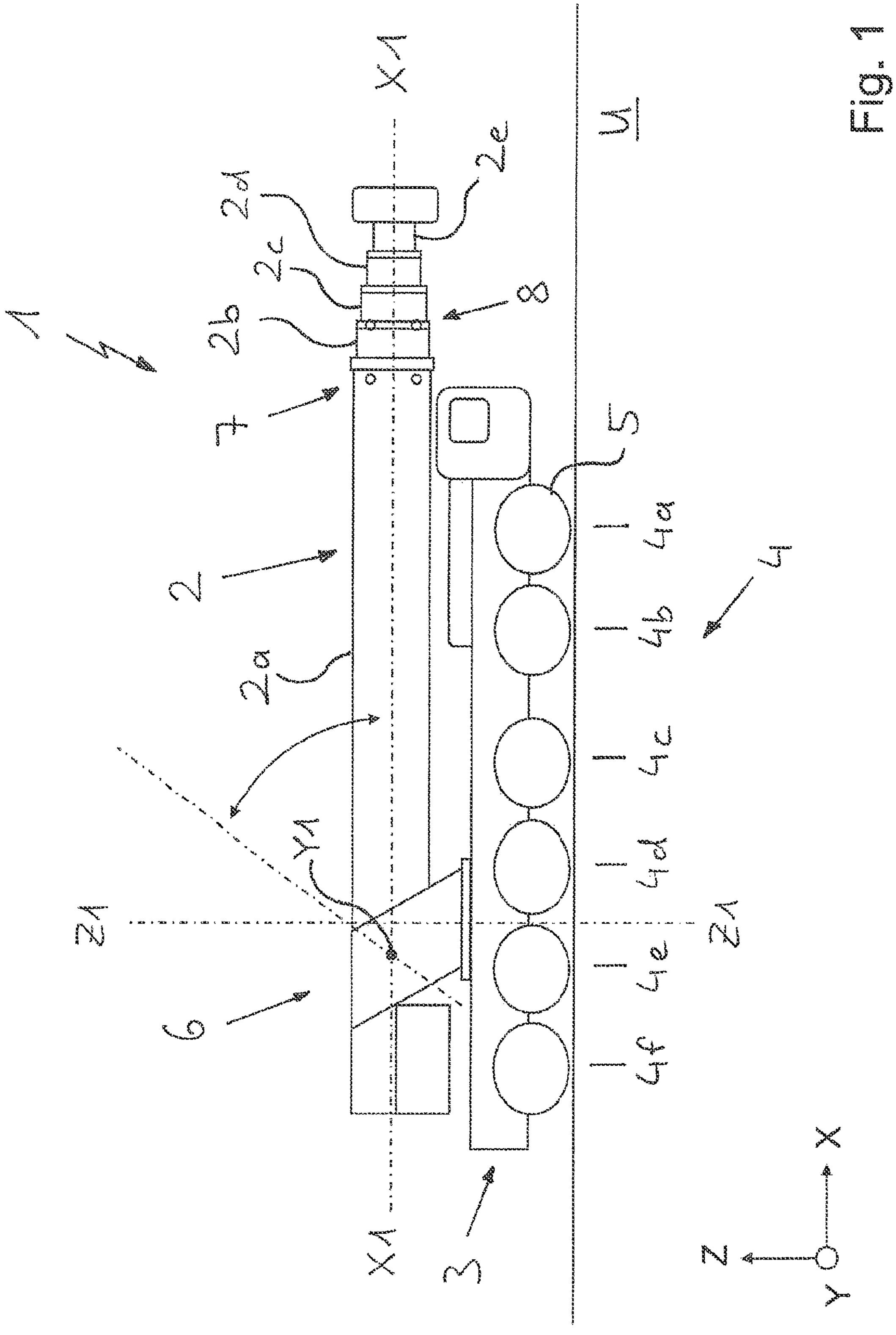
FIG. 1 shows a vehicle crane in accordance with the invention in a side view.

FIG. 1 shows the structure of a vehicle crane 1 in accordance with the invention which is parked on ground U and comprises a telescoping jib 2 which extends in the present case in parallel with a horizontal direction X. The vehicle crane 1 has a lower carriage 3 which, in the example shown here, comprises a wheeled running gear unit 4 which includes a total of six axles 4*a* to 4*f* each having at least two rubber-tyred wheels 5 mounted to be rotatable on the axles and spaced apart from one another in parallel with a transverse direction Y. Arranged on the lower carriage 3 is a superstructure 6 which carries the telescoping jib 2 and can be rotated relative to the lower carriage 3 about an axis of rotation Z1 extending in parallel with a substantially vertical upwards direction Z. The telescoping jib 2 extending in its longitudinal direction X1 is articulated correspondingly in a luffable manner on the superstructure 6 via a horizontal pivot axis Y1 extending in the transverse direction Y.

To illustrate the structure of the telescoping jib 2, it is shown in a state where it is extended to a limited extent. This shows that a basic box 2*a* of the telescoping jib 2 articulated to the superstructure 6 includes a plurality of inner boxes 2*b* to 2*e*. Owing to their stepped cross-sections matched to one another, said inner boxes 2*b* to 2*e* are arranged one inside the other and within the basic box 2*a* such that these can be displaced, in particular can be hydraulically retracted and extended, accordingly linearly in the longitudinal direction X1 of the telescoping jib 2. It is evident that the basic box 2*a* has a fastening region 7 which is indicated in the present case by two circles lying one above the other and is arranged on a free end portion of the basic box 2*a*. The first inner box 2*b* which is directly supported on the basic box 2*a* has a coupling region 8 which in the present case is likewise indicated by two circles lying one above the other and is arranged on a free end portion of the first inner box 2*b*. The fastening region 7 of the basic box 2*a* and the coupling region 8 of the first inner box 2*b* are used for simple rigging and de-rigging of the mobile crane 1 in relation to a bracing apparatus 9 which is not yet evident here, as will be made clearer hereinunder.

Figure 2:
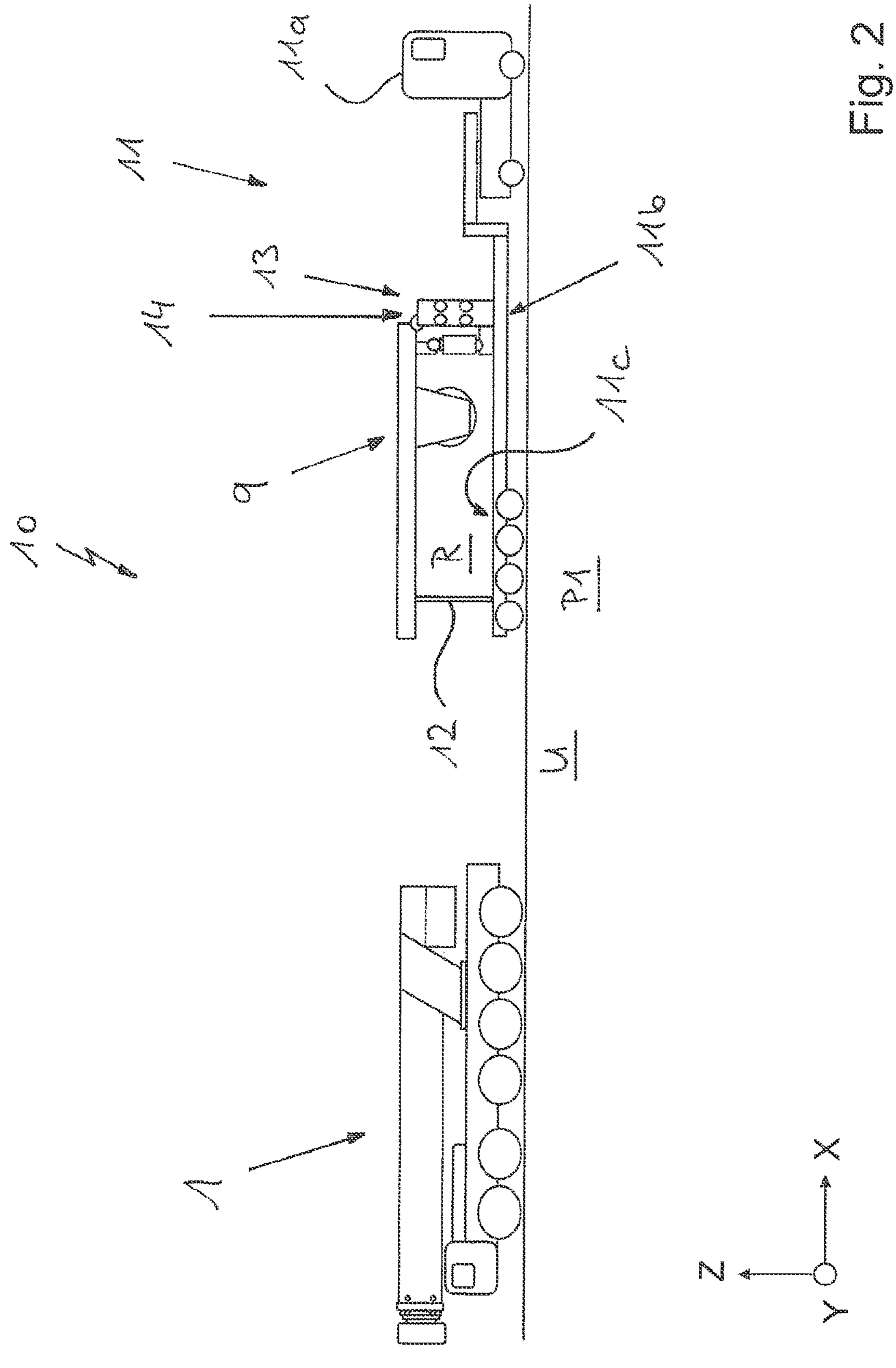
FIG. 2 shows a vehicle crane system in accordance with the invention comprising the vehicle crane of FIG. 1 in a side view.

FIG. 2 shows a vehicle crane system 10 in accordance with the invention which comprises the vehicle crane 1 in accordance with the invention explained in more detail above with reference to FIG. 1, as well as a transport unit 11 together with the aforementioned bracing apparatus 9. By way of example, the transport unit 11 shown in this case has a towing vehicle 11*a* which is coupled to a semi-trailer 11*b*. In this case, the bracing apparatus 9 is arranged on a loading surface 11*c* of the transport unit 11, in particular its semi-trailer 11*b*, so that it can be transported separately from the vehicle crane 1 to and from its respective place of usage. The bracing apparatus 9 which is also referred to as the lateral superlift jib lies with one of its end regions on the loading surface 11*c*, while its opposite end region is supported on the loading surface 11*c* via a support device 12. The bracing apparatus 9 typically consists of a semi-annular connection element, one or two bracing supports arranged in a pivotable manner thereon and in each case a pivot-out drive therefor. As a result, the part of the bracing apparatus 9 supported in this way is located accordingly in a spaced manner above the loading surface 11*c*, thus forming a free space R. By way of example, the support device 12 is allocated in this case to the transport unit 11, in particular its semi-trailer 11*b*, to which it is pivotably connected. In the present case, the support device 12 is in its usage position P1 which refers to its extension which is substantially vertical and thus in parallel with the upwards direction Z.

Looking at the part of the bracing apparatus 9 lying on the loading surface 11*c* of the transport unit 11, it becomes clear that it has two connection regions 13, 14, each indicated in the present case as circles lying one above the other on the connection element. The connection regions 13, 14 are arranged and formed in such a way that the first connection region 13 corresponds to the coupling region 8 provided on the first inner box 2*b* of the telescoping jib 2, while the second connection region 14 arranged immediately adjacent to the first connection region 13 corresponds to the fastening region 7 located on the basic box 2*a* of the telescoping jib 2.

With reference to the further FIGS. 3 to 11, the rigging of the vehicle crane 1 with the bracing apparatus 9 located on the transport unit 11 is described in more detail hereinafter, while the de-rigging of the vehicle crane 1 can be performed analogously in the correspondingly reverse order.

Figure 3:
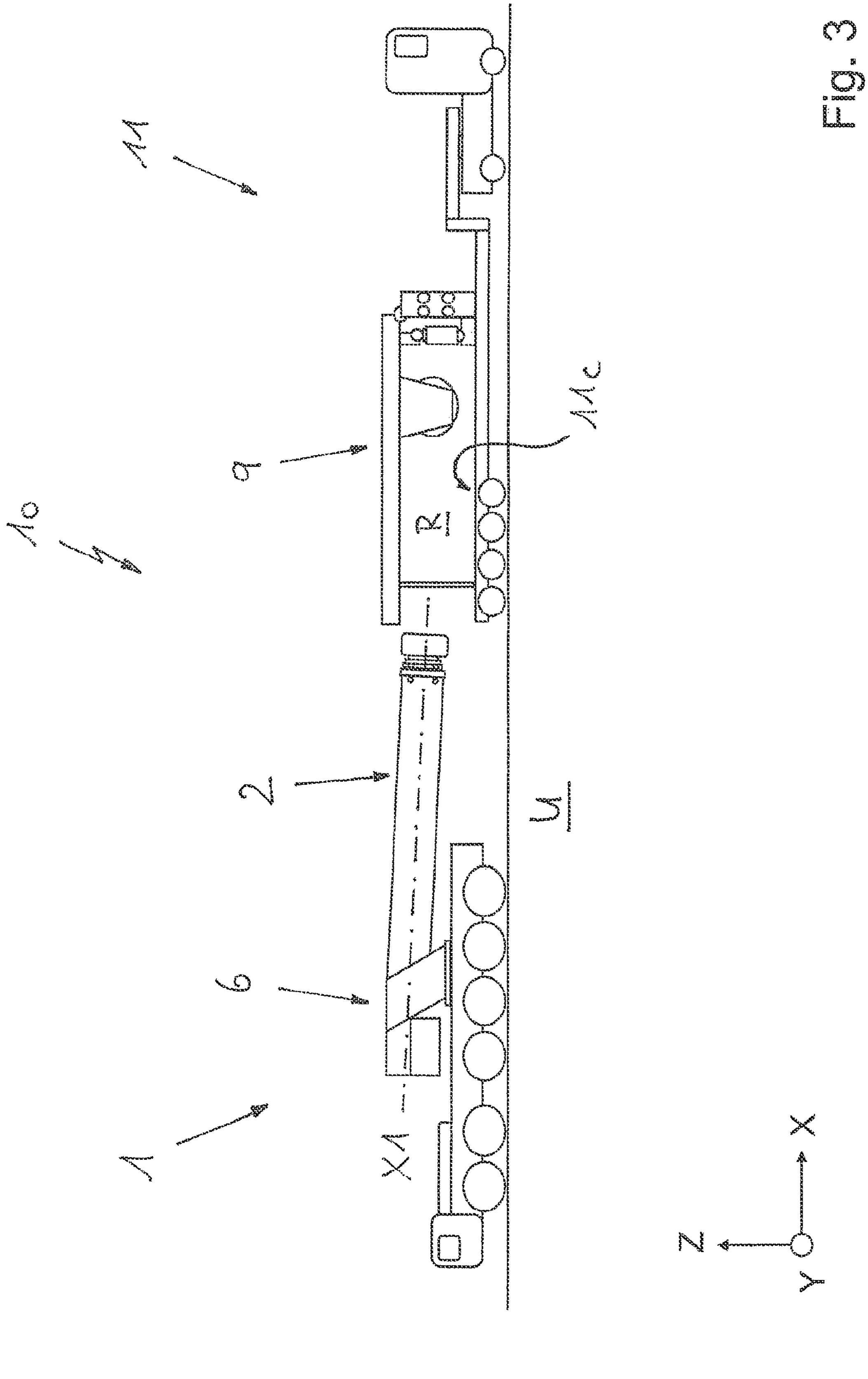
FIG. 3 shows the vehicle crane system of FIG. 2 with a changed orientation of a telescoping jib of the vehicle crane.

FIG. 3 shows the vehicle crane system 10 already shown in FIG. 2, with its vehicle crane 1 and transport unit 11 arranged with respect to one another. Compared to the illustration in FIG. 2, the superstructure 6 of the vehicle crane 1 has been rotated by 180° and so the longitudinal direction X1 of the telescoping jib 2 is oriented towards the longitudinal direction of the bracing apparatus 9. It can be seen that the free end of the telescoping jib 2 now points in the direction of the free space R between the loading surface 11*c* and the bracing apparatus 9, for which reason the telescoping jib 2 has been luffed slightly downwards from its previous horizontal extension. The arranging and orientation of the vehicle crane 1 and the transport unit 11 are effected by their corresponding movement and/or the orientation of the telescoping jib 2.

Figure 4:
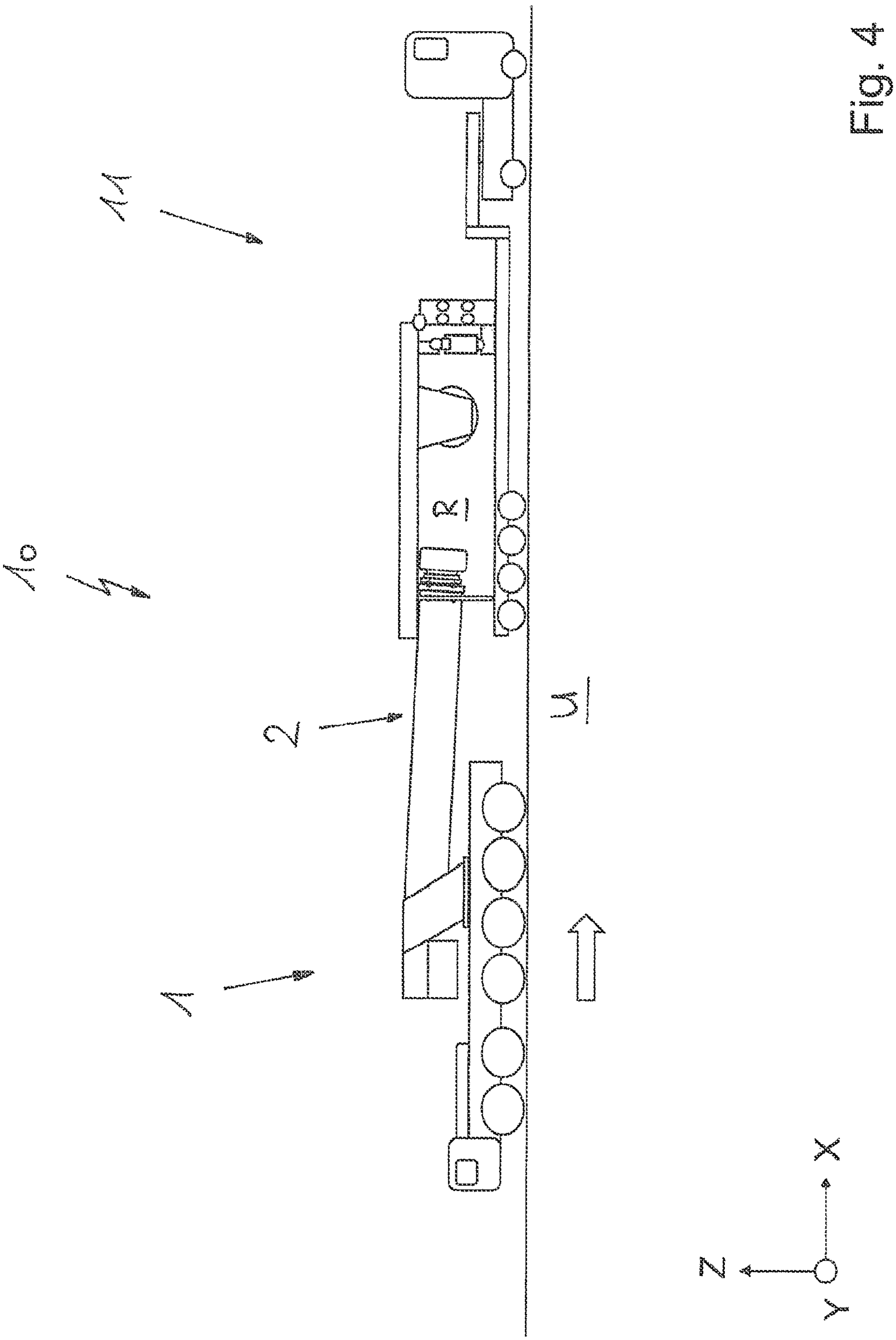
FIG. 4 shows the vehicle crane system of FIG. 3 with a changed position of the vehicle crane.

FIG. 4 illustrates the approach, which is performed by way of example in this case in reverse, of the vehicle crane 1 closer to the transport unit 11 (indicated by the arrow), whereby the telescoping jib 2 which is still retracted protrudes at least in part into the free space R and is received under or between the bracing support(s) of the bracing apparatus 9.

Figure 5:
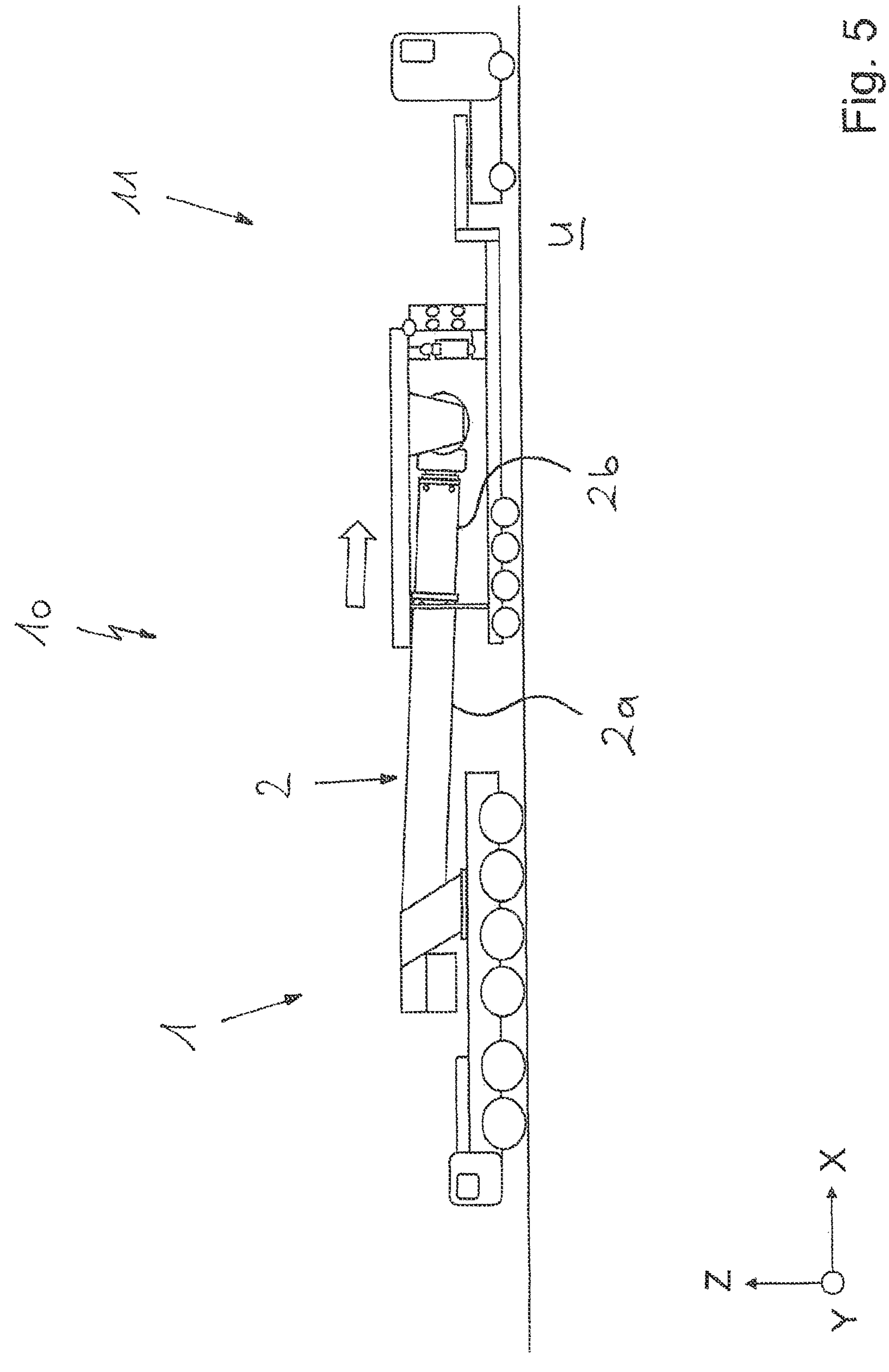
FIG. 5 shows the vehicle crane system of FIG. 4 in an intermediate position during extension of the telescoping jib.

FIG. 5 shows an intermediate station of the telescoping jib 2 being extended (indicated by an arrow), which in the example shown in this case is limited to the linear displacement of the first inner box 2*b* relative to the basic box 2*a*.

Figure 6:
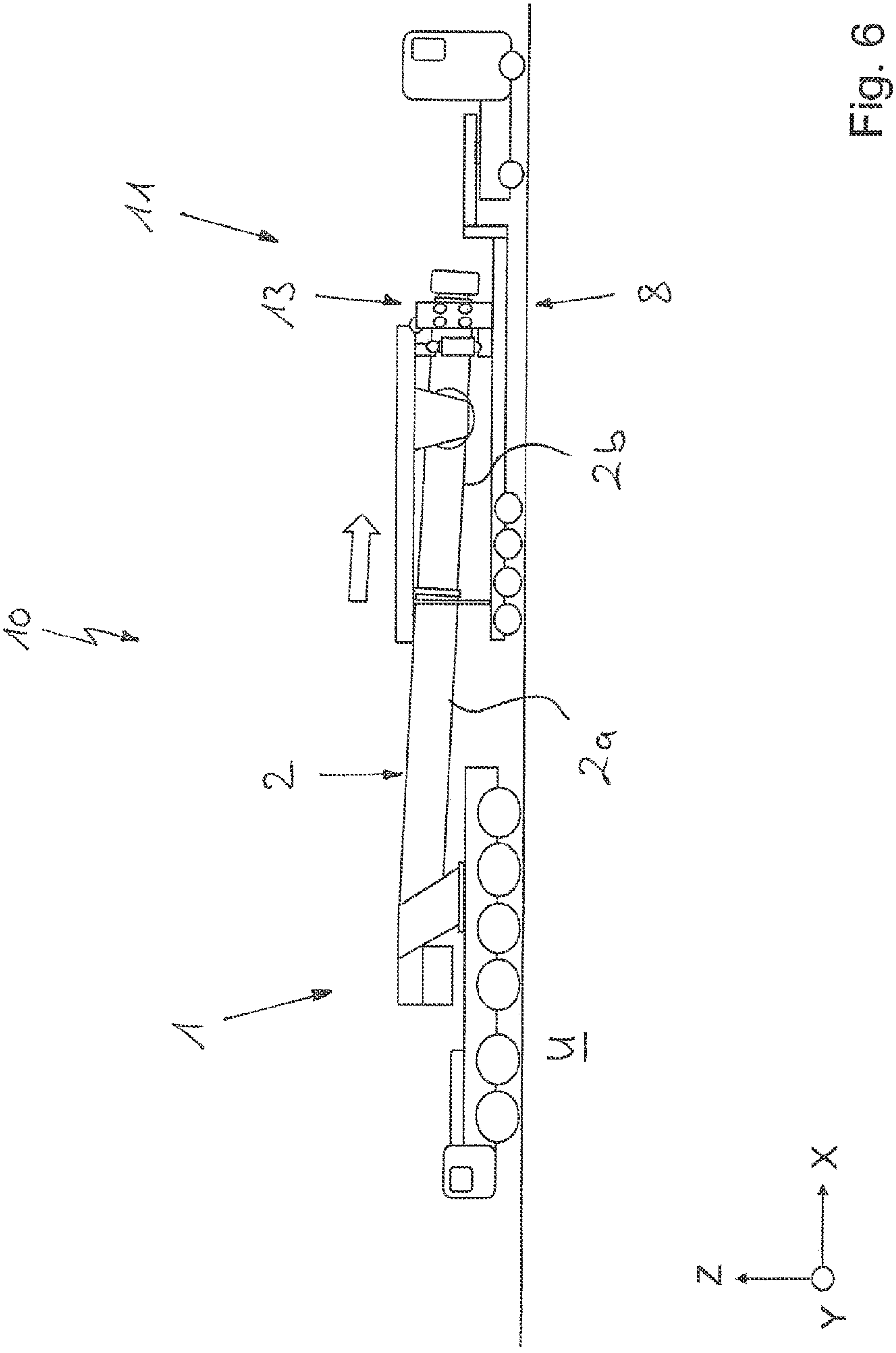
FIG. 6 shows the vehicle crane system of FIG. 5 in an end position of the extended telescoping jib.

FIG. 6 shows the end position of the extended telescoping jib 2 (indicated by arrow) required for rigging. Subsequently or simultaneously, the telescoping jib 2 is oriented e.g. by luffing it such that the first connection region 13 of the bracing apparatus 9 is aligned with the coupling region 8 of the first inner box 2*b*.

Figure 7:
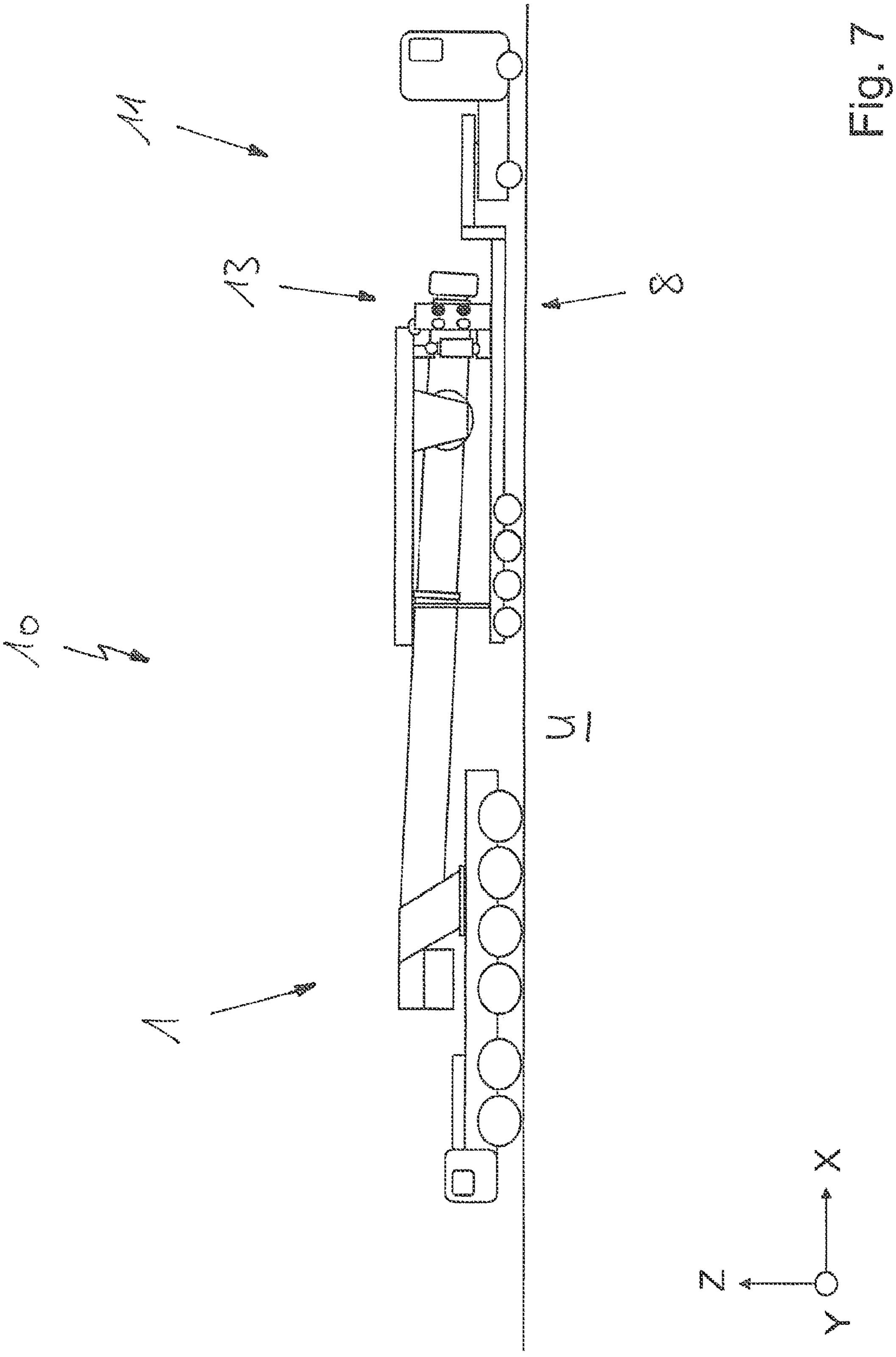
FIG. 7 shows the vehicle crane system of FIG. 6 in a first connected state of the telescoping jib with an attachment part to be received.

FIG. 7 illustrates the subsequent coupling of the first connection region 13 of the bracing apparatus 9 with the coupling region 8 of the inner box 2*b*, in that the first connection region 13, which was previously only indicated by two circles, is now shown with two black spots. In other words, the bracing apparatus 9 is now connected to the first inner box 2*b* of the telescoping jib 2, preferably via corresponding bolts. Now the telescoping jib 2 is slightly luffed up so that the bracing apparatus 9 is lifted off the loading surface 11*c* of the transport unit 11 and the support device 12. The one or the two bracing supports of the bracing apparatus 9 are preferably supported via a roller on the top side of the basic box 2*a*. The bracing supports of the bracing apparatus 9 can also be supported in a cantilever manner on the connection element of the bracing apparatus 9 and maintain a spaced interval from the basic box 2*a*.

Figure 8:
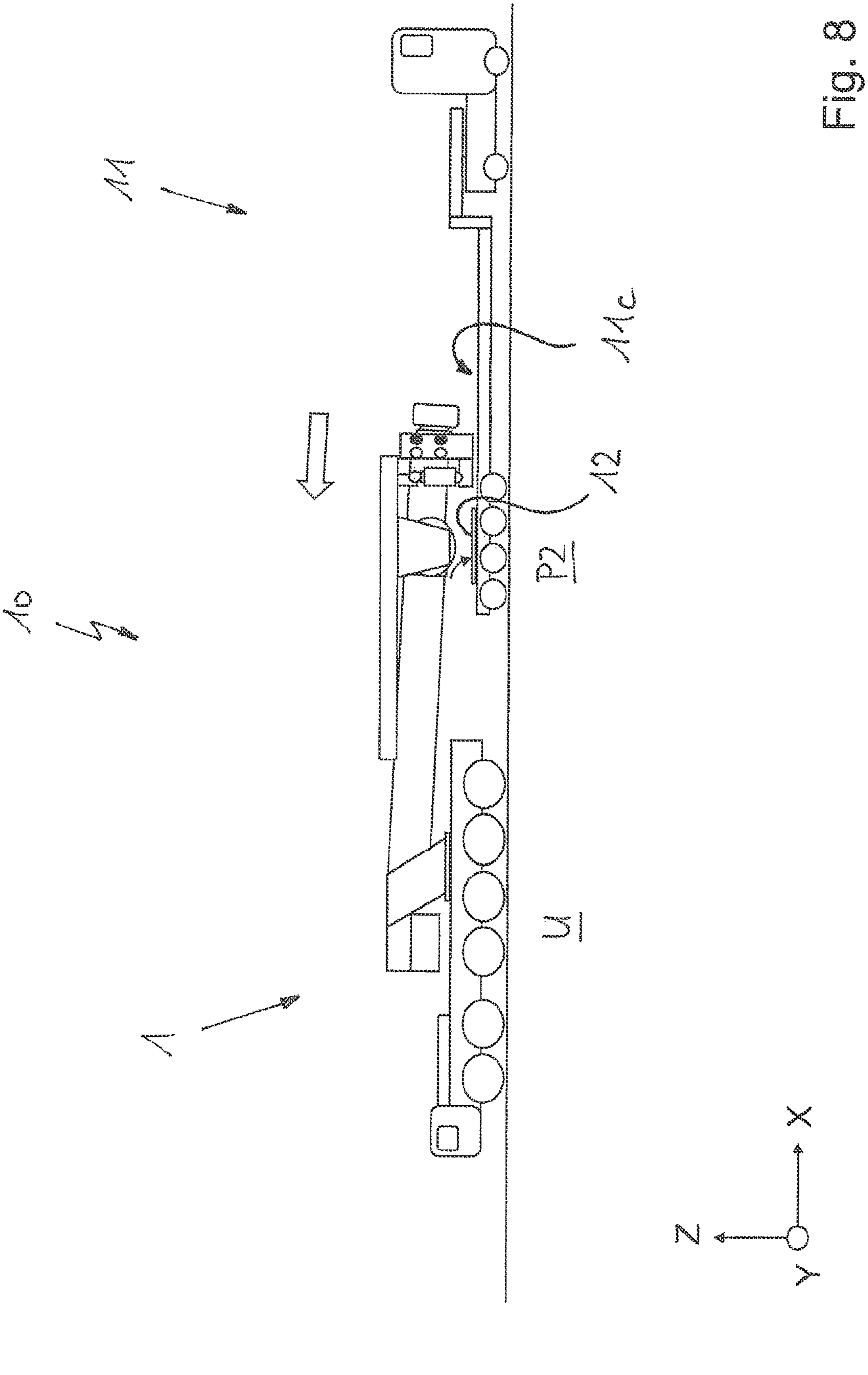
FIG. 8 shows the vehicle crane system of FIG. 7 in an intermediate position during retraction of the telescoping jib with a received attachment part.

FIG. 8 shows the retraction of the telescoping jib 2, in particular its first inner box 2*b*. By reason of the coupling with the bracing apparatus 9, the latter is simultaneously displaced away from the loading surface 11*c* of the transport unit 11 towards the vehicle crane 1 (indicated by arrow). At a suitable point in time, the support device 12 is pivoted from its usage position P1 to a substantially horizontal non-usage position P2 with respect thereto (as indicated by a curved arrow).

Figure 9:
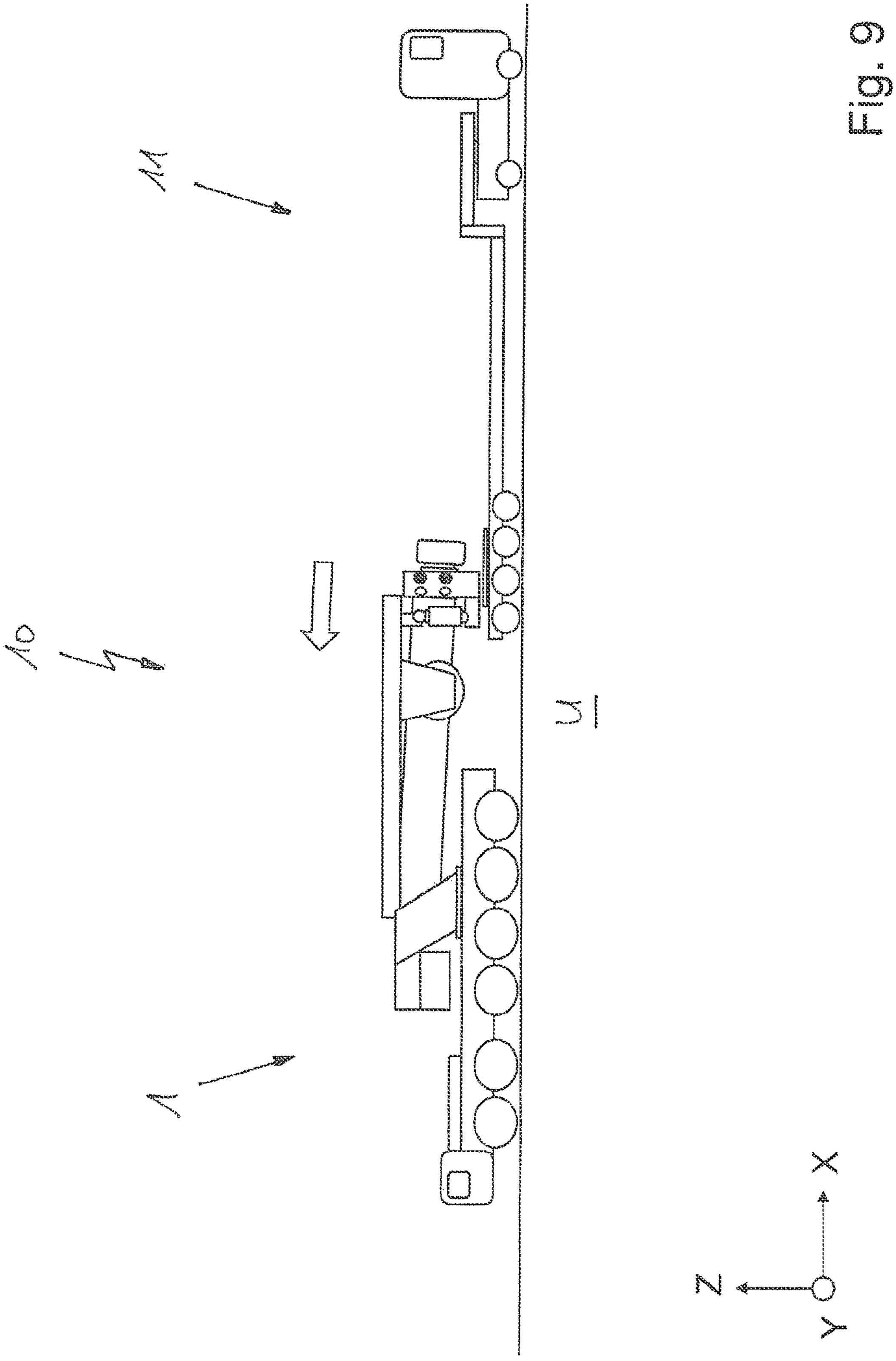
FIG. 9 shows the vehicle crane system of FIG. 8 in an end position of the retracted telescoping jib with a received attachment part.

FIG. 9 illustrates the further retraction of the telescoping jib 2 to an end position (indicated by arrow). In this end position, the second connection region 14 of the bracing apparatus 9 and the fastening region 7 of the basic box 2*a* of the telescoping jib 2 are aligned with one another. If required, their aligned orientation must be adjusted by correspondingly linearly displacing the first inner box 2*b* relative to the basic box 2*a*.

Figure 10:
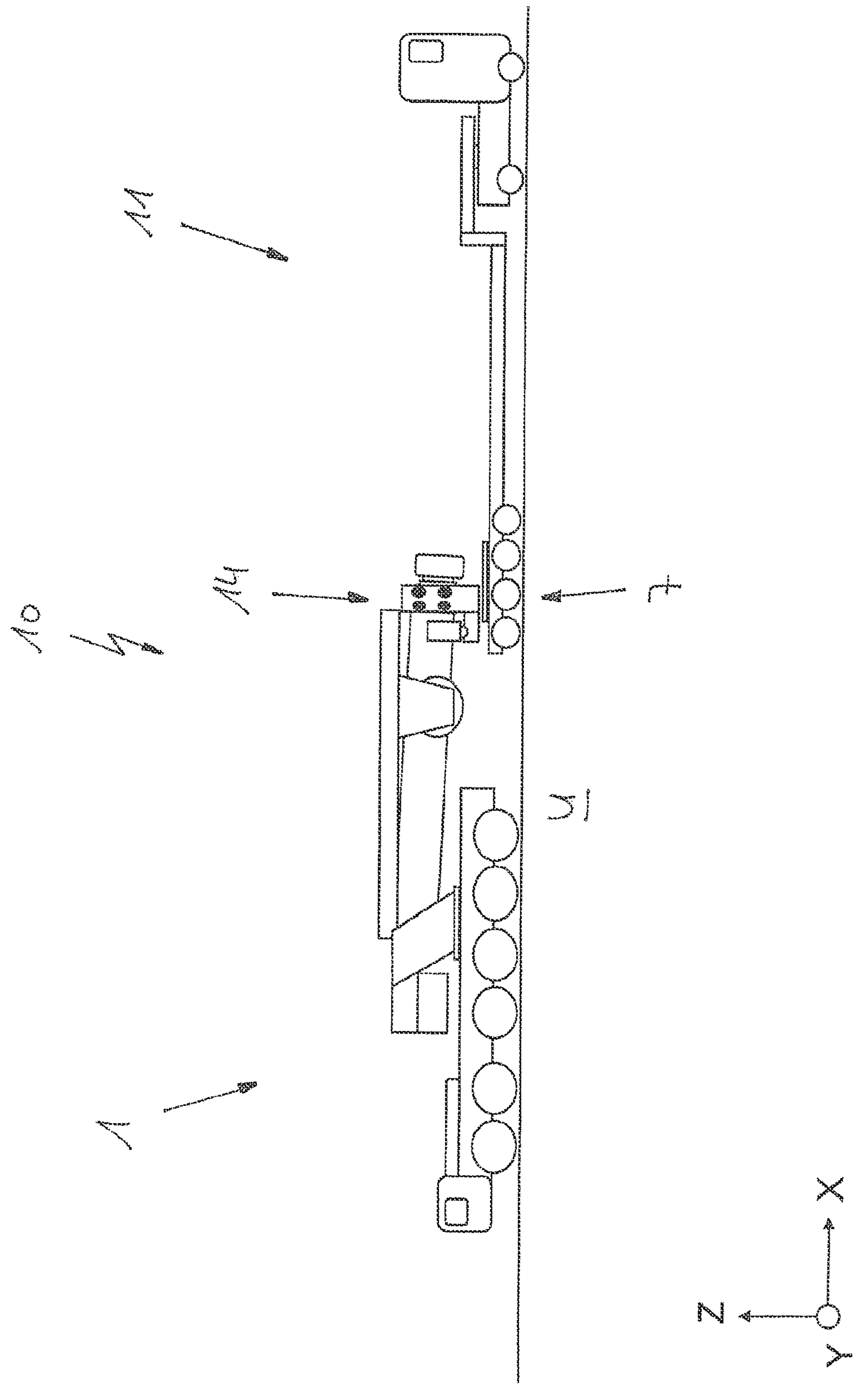
FIG. 10 shows the vehicle crane system of FIG. 9 in a second connected state of the telescoping jib with the received attachment part.

FIG. 10 shows the transfer of the bracing apparatus 9 to the basic box 2*a* of the telescoping jib 2 which is associated with a coupling of the second connection region 14 of the bracing apparatus 9 with the fastening region 7 of the basic box 2*a*, preferably via bolts. In the present case, this is illustrated by the fact that the second connection region 13 which was previously indicated only by two circles is now likewise shown with two black spots.

Figure 11:
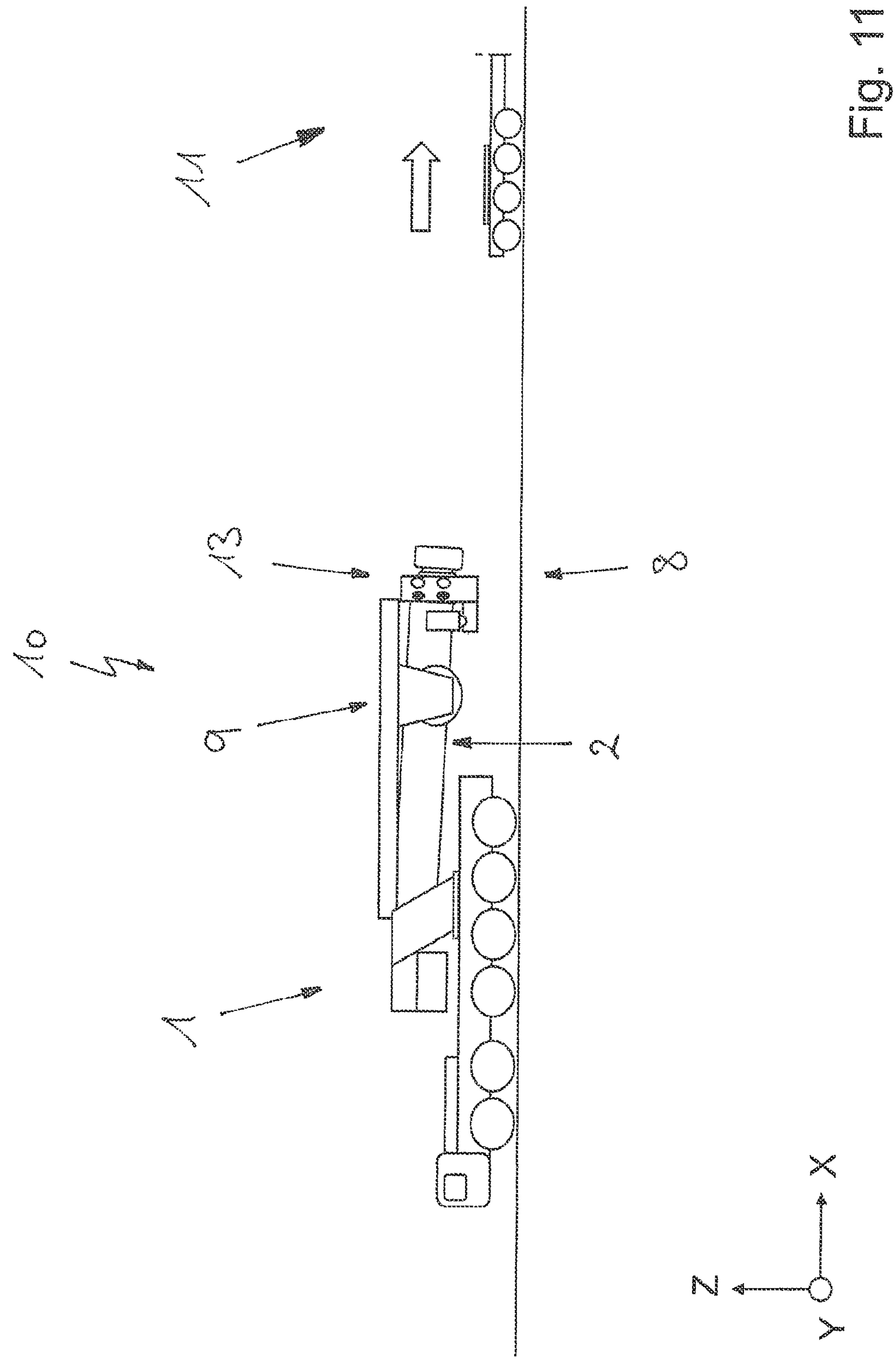
FIG. 11 shows the vehicle crane system of FIG. 10 in a partially unconnected state of the telescoping jib with the received attachment part.

FIG. 11 shows the end of the rigging process, in which the transport unit 11 is removed e.g. from the vehicle crane 1 (indicated by arrow). In order to restore the linear mobility of the telescoping jib 2, the coupling between the first connection region 13 of the bracing apparatus 9 and the coupling region 8 of the inner box 2*b*, as required to receive the bracing apparatus 9, is now released. In order to indicate this, the corresponding black spots have been replaced in the present case by circles.

As already indicated, the bracing apparatus 9 is transferred from the telescoping jib 2 of the vehicle crane 1 back to the transport unit 11 in the reverse manner, as already shown in the rest of the description and which can be followed in a logical manner using FIGS. 1 to 11 explained herein. For this purpose, the telescoping jib 2 is, inter alia, initially retracted or extended until the first connection region 13 of the bracing apparatus 9 is then aligned with the coupling region 8 of the first inner box 2*b* of the telescoping jib 2 so that they can be coupled together. Subsequently, the second connection region 14 of the bracing apparatus 9 is then decoupled from the fastening region 7 of the basic box 2*a*, and so the bracing apparatus 9 can be displaced away from its basic box 2*a* by extension of the telescoping jib 2. Placing the bracing apparatus 9 down on the loading surface 11*c* of the transport unit 11 and detaching it from the first basic box 2*b* follow logically from the foregoing.

The invention claimed is:

1. A vehicle crane system, comprising:

a vehicle crane, the vehicle crane comprising a telescoping jib which has a basic box with linearly displaceable inner boxes, wherein the telescoping jib is configured to be equipped with a bracing apparatus;

at least one fastening region is arranged on the basic box, wherein the fastening region is configured to fix the bracing apparatus; and wherein at least one coupling region is arranged on one of the inner boxes and is configured to be connected to the bracing apparatus for the purpose of rigging and/or de-rigging the bracing apparatus.

2. The vehicle crane system as claimed in claim 1, wherein the coupling region is arranged on a free end portion of an inner box.

3. The vehicle crane system as claimed in claim 2, wherein a first inner box is supported directly on the basic box, and wherein the coupling region is arranged on the first inner box.

4. The vehicle crane system as claimed in claim 3, further comprising the bracing apparatus and a transport unit configured to transport the bracing apparatus.

5. The vehicle crane system as claimed in claim 4, wherein the bracing apparatus has a first connection region corresponding to the coupling region of one of the inner boxes of the telescoping jib of the vehicle crane and has a second connection region corresponding to the fastening region of the basic box of the telescoping jib of the vehicle crane.

6. The vehicle crane system as claimed in claim 5, wherein the first connection region and the second connection region of the bracing apparatus are arranged next to one another.

7. The vehicle crane system as claimed in claim 6, wherein the first connection region and the second connection region of the bracing apparatus are arranged directly next to one another.

8. The vehicle crane system as claimed in claim 4, wherein the bracing apparatus and/or the transport unit has at least one support via which the bracing apparatus can be supported over a loading surface of the transport unit, thus forming a free space.

9. The vehicle crane system as claimed in claim 1, further comprising the bracing apparatus and a transport unit configured to transport the bracing apparatus.

10. The vehicle crane system as claimed in claim 9, wherein the bracing apparatus has a first connection region corresponding to the coupling region of one of the inner boxes of the telescoping jib of the vehicle crane and has a second connection region corresponding to the fastening region of the basic box of the telescoping jib of the vehicle crane.

11. The vehicle crane system as claimed in claim 10, wherein the first connection region and the second connection region of the bracing apparatus are arranged next to one another.

12. The vehicle crane system as claimed in claim 11, wherein the first connection region and the second connection region of the bracing apparatus are arranged directly next to one another.

13. The vehicle crane system as claimed in claim 9, wherein the bracing apparatus and/or the transport unit has at least one support via which the bracing apparatus can be supported over a loading surface of the transport unit, thus forming a free space.

14. The vehicle crane system as claimed in claim 13, wherein the at least one support comprises a pivotable support.

15. A method for transferring a bracing apparatus from a transport unit of a vehicle crane system to a telescoping jib of a vehicle crane, said method comprising:

providing the transport unit having the bracing apparatus, received thereon, in the region of the vehicle crane;

arranging the transport unit and telescoping jib relative to one another such that a longitudinal direction of the bracing apparatus is oriented with respect to a longitudinal direction of the telescoping jib;

before or after the arranging the transport unit step, orienting a longitudinal direction of the telescoping jib towards a free space located between a loading surface of the transport unit and the bracing apparatus;

extending at least one inner box of the telescoping jib into the free space;

orienting the telescoping jib until a first connection region of the bracing apparatus is aligned with a coupling region of an inner box;

coupling the first connection region of the bracing apparatus to the coupling region of the inner box;

retracting the at least one inner box with simultaneous displacement of the bracing apparatus away from the transport apparatus towards the vehicle crane;

terminating the retraction of the at least one inner box as soon as a second connection region of the bracing apparatus is aligned with a fastening region of a basic box of the telescoping jib;

coupling the second connection region of the bracing apparatus to the fastening region of the basic box; and releasing the coupling between the first connection region of the bracing apparatus and the coupling region of the inner box.

16. The method as claimed in claim 15, wherein during or after the retraction of the telescoping jib, a support configured to support the bracing apparatus on the loading surface of the transport unit is pivoted from a usage position to a non-usage position.

17. The method as claimed in claim 15, wherein the step of orienting the telescoping jib until a first connection region of the bracing apparatus is aligned with a coupling region of an inner box comprises luffing the telescoping jib until a first connection region of the bracing apparatus is aligned with a coupling region of an inner box.

18. A method for transferring a bracing apparatus from a basic box of a telescoping jib of a vehicle crane to a transport unit of a vehicle crane system, said method comprising:

providing the transport unit in the region of the vehicle crane;

retracting or extending the telescoping jib as required until a first connection region of the bracing apparatus is aligned with a coupling region of an inner box of the telescoping jib;

coupling the first connection region of the bracing apparatus to the coupling region of the inner box;

decoupling a second connection region of the bracing apparatus from a fastening region of the basic box;

subsequently or previously arranging a transport apparatus and the telescoping jib relative to one another such that a longitudinal direction of the telescoping jib is oriented with respect to the longitudinal direction of a loading surface of the transport unit;

extending at least the inner box of the telescoping jib coupled to the bracing apparatus while simultaneously displacing the bracing apparatus away from the vehicle crane towards the loading surface of the transport unit;

terminating the extension of the telescoping jib as soon as the bracing apparatus is arranged on or above the loading surface of the transport unit;

orienting the telescoping jib as required such that the bracing apparatus is placed down on the loading surface of the transport unit;

decoupling the first connection region of the bracing apparatus from the coupling region of the inner box;

retracting the telescoping jib until it is at least removed from a free space located between the loading surface of the transport unit and the bracing apparatus;

previously or simultaneously orienting the telescoping jib as required in such a way that it has no contact with the bracing apparatus.

19. The method as claimed in claim 18, wherein during or after the extension of the telescoping jib, a support configured to support the bracing apparatus on the loading surface of the transport unit is pivoted from a non-usage position to a usage position.

20. The method as claimed in claim 18, wherein the step of orienting the telescoping jib as required such that the bracing apparatus is placed down on the loading surface of the transport unit comprises luffing the telescoping jib as required, and wherein the step of previously or simultaneously orienting the telescoping jib as required in such a way that it has no contact with the bracing apparatus comprises previously or simultaneously luffing the telescoping jib as required.

* * * * *